(12) United States Patent
Shargots et al.

(10) Patent No.: US 12,437,886 B2
(45) Date of Patent: Oct. 7, 2025

(54) CONTROL ROD REMOTE DISCONNECT MECHANISM

(71) Applicant: BWXT Advanced Technologies LLC, Lynchburg, VA (US)

(72) Inventors: Scott J. Shargots, Forest, VA (US); Ryan Z. Ziegler, Forest, VA (US); Jason C. Brown, Lynchburg, VA (US); David K. Haslet, Lynchburg, VA (US); Emily D. Fleming, Forest, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 149 days.

(21) Appl. No.: 17/977,789

(22) Filed: Oct. 31, 2022

(65) Prior Publication Data
US 2023/0134417 A1     May 4, 2023

Related U.S. Application Data (60) Provisional application No. 63/273,687, filed on Oct. 29, 2021.

(51) Int. Cl.
*G21C 7/14*       (2006.01)
*G21C 7/117*      (2006.01)
*G21C 7/12*       (2006.01)

(52) U.S. Cl.
CPC ............... *G21C 7/12* (2013.01); *G21C 7/117* (2013.01); *G21C 7/14* (2013.01)

(58) Field of Classification Search
CPC ... G21C 7/10; G21C 7/12; G21C 7/14; G21C 7/117
See application file for complete search history.

(56) References Cited

U.S. PATENT DOCUMENTS 3,046,906 A  *  7/1962  Budzich ................... G21C 7/02
                                                      91/487
3,720,580 A     3/1973  Schabert et al.
(Continued)

FOREIGN PATENT DOCUMENTS

CN      112071446 A  * 12/2020  ............... G21C 7/16
GB         874222 A  *  8/1961
WO  WO-2023076676 A1 *  5/2023  ............. G21C 7/117

OTHER PUBLICATIONS

International Search Report and Written Opinion, PCT/US2022/48421, dated Jan. 31, 2023, 7 pages.
(Continued)

*Primary Examiner* — Lily C Garner
(74) *Attorney, Agent, or Firm* — Nelson Mullins Riley & Scarborough LLP (57) ABSTRACT

A control rod assembly having a connecting rod, a spider, a plurality of control rods, a coupling sleeve secured to the connecting rod and including a body portion defining at least one cam pin, and a barrel cam defining a cam track, the barrel cam being rotatably secured to the spider. The cam track includes a first camming surface and a second camming surface that are configured so that the barrel cam rotates in a first direction as the at least one cam pin slides along the first and second camming surfaces. The barrel cam rod is rotatable between a first position in which the spider is connected to the connecting rod and a second position in which the spider is disconnected from the connecting rod.

20 Claims, 12 Drawing Sheets

(56) References Cited

U.S. PATENT DOCUMENTS

| | | | | |
|---|---|---|---|---|
| 3,741,867 A * | 6/1973 | Fortescue | ............... | G21C 7/20 |
| | | | | 976/DIG. 129 |
| 3,822,439 A * | 7/1974 | Wallin | ............... | F16H 25/2266 |
| | | | | 376/234 |
| 4,147,589 A * | 4/1979 | Roman | ............... | G21C 7/12 |
| | | | | 376/233 |
| 4,646,414 A * | 3/1987 | Wilson | ............... | G21C 3/334 |
| | | | | 29/723 |
| 4,711,756 A | 12/1987 | Nakazato | | |
| 4,752,434 A | 6/1988 | Savary | | |
| 4,778,645 A * | 10/1988 | Altman | ............... | G21C 19/00 |
| | | | | 376/233 |
| 5,141,711 A * | 8/1992 | Gjertsen | ............... | G21C 7/117 |
| | | | | 376/233 |
| 5,513,229 A * | 4/1996 | Willems | ............... | G21C 7/16 |
| | | | | 376/258 |
| 5,761,260 A * | 6/1998 | Bergamaschi | ........ | G21C 7/12 |
| | | | | 376/233 |
| 8,483,346 B2 * | 7/2013 | McCarty | ............... | G21C 7/117 |
| | | | | 376/327 |
| 8,526,563 B2 * | 9/2013 | Shargots | ............... | G21C 7/12 |
| | | | | 376/239 |
| 9,025,720 B2 * | 5/2015 | Tylman | ............... | G21C 19/115 |
| | | | | 376/260 |
| 10,096,388 B2 * | 10/2018 | Shargots | ............... | G21C 7/12 |
| 10,102,933 B2 * | 10/2018 | Walton | ............... | G21C 7/14 |
| 10,600,518 B2 * | 3/2020 | Shargots | ............... | G21C 7/12 |
| 2011/0222640 A1 * | 9/2011 | DeSantis | ............... | G21C 7/14 |
| | | | | 376/229 |
| 2012/0051482 A1 * | 3/2012 | Shargots | ............... | G21C 7/117 |
| | | | | 376/219 |
| 2013/0272464 A1 * | 10/2013 | Walton | ............... | G21C 7/20 |
| | | | | 376/225 |
| 2023/0137322 A1 * | 5/2023 | Shargots | ............... | G21C 7/10 |
| | | | | 376/233 |

OTHER PUBLICATIONS

International Search Report and Written Opinion, PCT/US2022/48446, dated Feb. 9, 2023, 7 pages.

* cited by examiner

CONTROL ROD REMOTE DISCONNECT MECHANISM

CLAIM OF PRIORITY

This application claims priority to U.S. provisional patent application No. 63/273,687 filed Oct. 29, 2021, the disclosure of which is incorporated by reference herein.

TECHNICAL FIELD

The presently disclosed invention relates generally to systems and methods of use thereof for controlling reactor power levels in nuclear reactors and, more specifically, to systems and methods of use thereof for controlling the operation of control rods for nuclear thermal reactors.

BACKGROUND

In thermal nuclear power plants, a nuclear reactor core comprises a fissile material having size and composition selected to support a desired nuclear fission chain reaction. The core is disposed in a pressure vessel immersed in primary coolant water. It is further known to control or stop the reaction by inserting "control rods" comprising a neutron-absorbing material into guide tubes passing through the reactor core. When inserted, the control rods absorb neutrons so as to slow or stop the chain reaction.

The control rods are operated by control rod drive mechanisms (CRDMs). With "regulating" control rods, the insertion of the control rods is continuously adjustable so as to provide continuously adjustable reaction rate control. For "shutdown" control rods, the insertion is either fully in or fully out. During normal operation the shutdown rods are fully retracted from the reactor core, whereas during a SCRAM, the shutdown rods are fully inserted so as to rapidly stop the chain reaction. Control rods can also be designed to perform both regulating and shutdown rod functions. In some such dual function control rods, the control rod is configured to be detachable from the CRDM in the event of a SCRAM, such that the detached control rod falls into the reactor core under the influence of gravity. In some systems, such as naval systems, a hydraulic pressure or other positive force (other than gravity) is also provided to drive the detached control rods into the core.

To complete the control system, a control rod/CRDM coupling is provided. A known coupling includes a connecting rod having a lower end at which a spider is secured. The upper portion of the connecting rod operatively connects with the CRDM. In regulating rods, this connection includes a lead screw or other incremental adjustment element. Conventionally, the lead screw scrams with the connecting rod, spider, and control rods as a translating assembly (also known as the "control rod assembly"). In some known approaches, however, the lead screw may be retained in the CRDM and the remainder of the control rod assembly scrams. To reduce cost and overall system complexity, a single CRDM is typically connected with a plurality of control rods via a spider. In this arrangement, all the control rods coupled with a single spider together as a translating control rod assembly (CRA). In practice a number of CRDM units are provided, each of which is coupled with a plurality of control rods via a spider, so as to provide some redundancy. The spider extends laterally away from the lower end of the connecting rod to provide attachment points for multiple control rods.

During certain operations, for example, extended shutdown for maintenance, etc., it may be required that the translating control rods of the CRAs be fully inserted into the reactor core for extended periods of time. As such, it is desirable to have the ability to remotely engage and disengage the translating control rods from the CRDMs at a fixed location, such as between the connecting rods and the spiders, by vertical motion of the connecting rods.

SUMMARY OF INVENTION

One embodiment of the present disclosure provides a control rod assembly for use with a reactor core, having an elongated connecting rod, a spider assembly that is releasably securable to the connecting rod, a plurality of control rods that extends downwardly from the spider assembly, a coupling sleeve secured to a bottom end of the connecting rod, the coupling sleeve including a body portion with an inner wall defining a cylindrical central bore and at least one cam pin extending radially-inward from the inner wall of the central bore, and a barrel cam being rotatably secured to an upper portion of the spider assembly and having a cylindrical body portion with an outer surface thereof defining a cam track, the cam track including an entry opening defined by a top end face of the body portion of the barrel cam, a first camming surface, and a second caroming surface, the first camming surface and the second caroming surface being configured so that the barrel cam rotates in a first direction as the at least one cam pin slides along the first camming surface and the second camming surface, wherein the barrel cam is rotatable with respect to the connecting rod between a first position in which the spider is connected to the connecting rod, and a second position in which the spider is disconnected from the connecting rod.

Another embodiment of the present disclosure provides a disconnect mechanism for use with a control rod drive mechanism having a torque tube, including a connecting rod that is non-rotatably disposed within the torque tube, a lock cam assembly rotatably secured to a bottom end of the connecting rod, the lock cam assembly including a body portion and at least one locking cam extending radially-outwardly therefrom, and a locking collar disposed non-rotatably within the torque tube, the locking collar including an inner surface defining a central bore and at least one locking recess therein, the locking recess including an entry slot extending downwardly from a top edge of the locking collar, wherein the connecting rod is axially-movable with respect to the control rod drive mechanism between a first position in which the lock cam assembly is rotatable with respect to the connecting rod, and a second position in which the lock cam assembly is non-rotatable with respect to the connecting rod.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements.

Repeat use of reference characters in the present specification and drawings is intended to represent same or analogous features or elements of the invention according to the disclosure.

DESCRIPTION OF THE PREFERRED EMBODIMENTS

Reference will now be made to presently preferred embodiments of the invention, one or more examples of which are illustrated in the accompanying drawings. Each example is provided by way of explanation, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of the control rod assembly with a remote disconnect mechanism, such as but not limited to "vertical," "horizontal," "upper," "lower," "above," or "below," refer to directions and relative positions with respect to the disconnect mechanism's orientation in its normal intended operation, as indicated in the Figures herein. Thus, for instance, the terms "vertical" and "upper" refer to the vertical direction and relative upper position in the perspectives of the Figures and should be understood in that context, even with respect to a reactor that may be disposed in a different orientation.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

Figure 1:
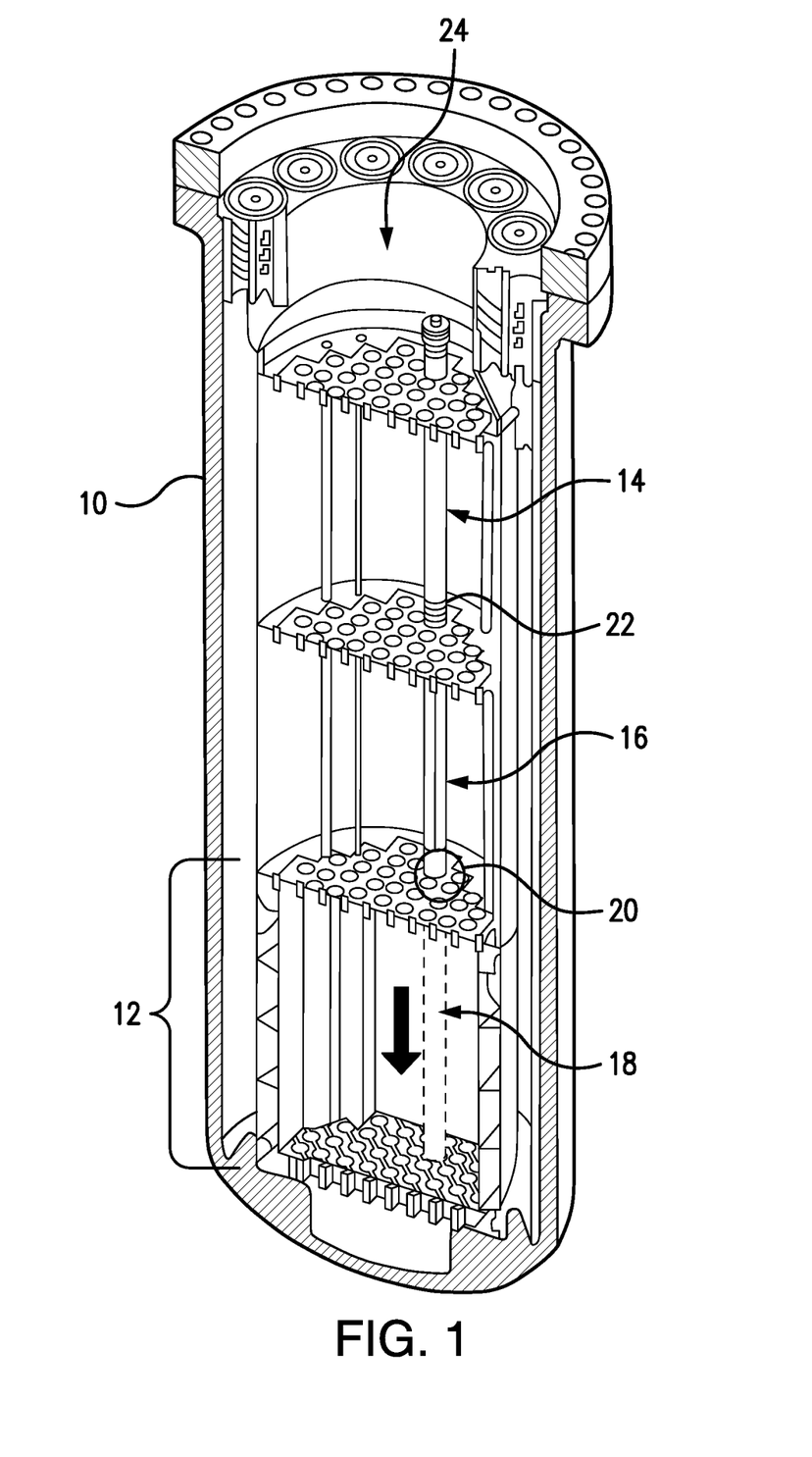
FIG. 1 is a partial perspective, cross-sectional view of a lower portion of a nuclear reactor pressure vessel including an illustrative control rod assembly.

With reference to FIG. 1, a relevant portion of an illustrative nuclear reactor pressure vessel 10 includes a reactor core 12 located proximate to a bottom of the pressure vessel 10. The core 12 includes or contains radioactive material such as, by way of illustrative example, enriched uranium oxide (that is, $UO_2$ processed to have an elevated $^{235}U/^{238}U$ ratio). A control rod drive mechanism (CRDM) 14 assembly is diagrammatically illustrated. The illustrative CRDM 14 is an internal CRDM that is disposed within the pressure vessel 10. In alternate embodiments, an external CRDM may be employed. Typically, there are multiple CRDM units each coupled with a plurality of control rods, although these additional CRDM units are not shown in FIG. 1. The pressure vessel 10 is drawn showing the space for such additional CRDM units.

Figure 3:
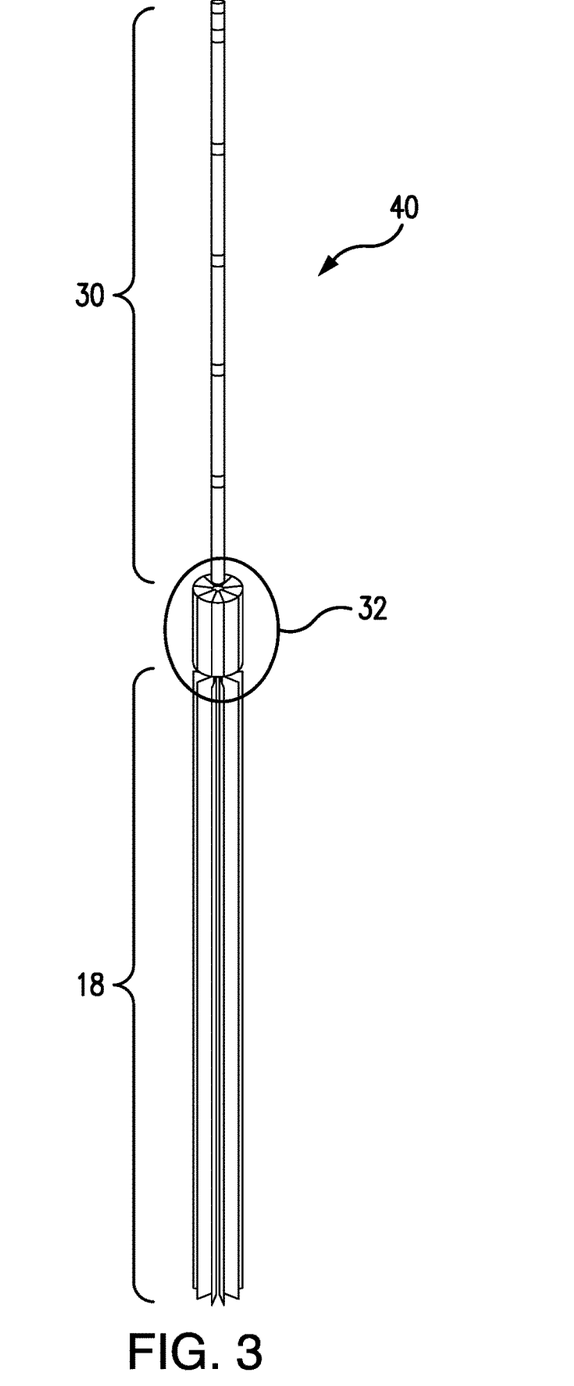
FIG. 3 is a perspective view of the control rods and the connecting rod of the control rod assembly shown in FIG. 2.

Below the CRDM 14 is a control rod guide frame 16, which in the perspective view of FIG. 1 blocks from view the control rod/CRDM coupling assembly (i.e., the spider 32 and connecting rod 30, both shown in FIG. 3). Extending below the guide frame 16 is a plurality of control rods 18. FIG. 1 shows the control rods 18 in their fully inserted position in which the control rods 18 are maximally inserted into the core 12. In the fully inserted position, the spider 32 (FIG. 3) is located at a lower location 20 within the control rod guide frame 16. In the illustrative embodiment of FIG. 1, the CRDM 14 and the control rod guide frame 16 are spaced apart by a standoff 22 comprising a hollow tube having opposite ends coupled with the CRDM 14 and the guide frame 16, respectively, and through which the connecting rod 30 (FIG. 3) passes.

Figure 2:
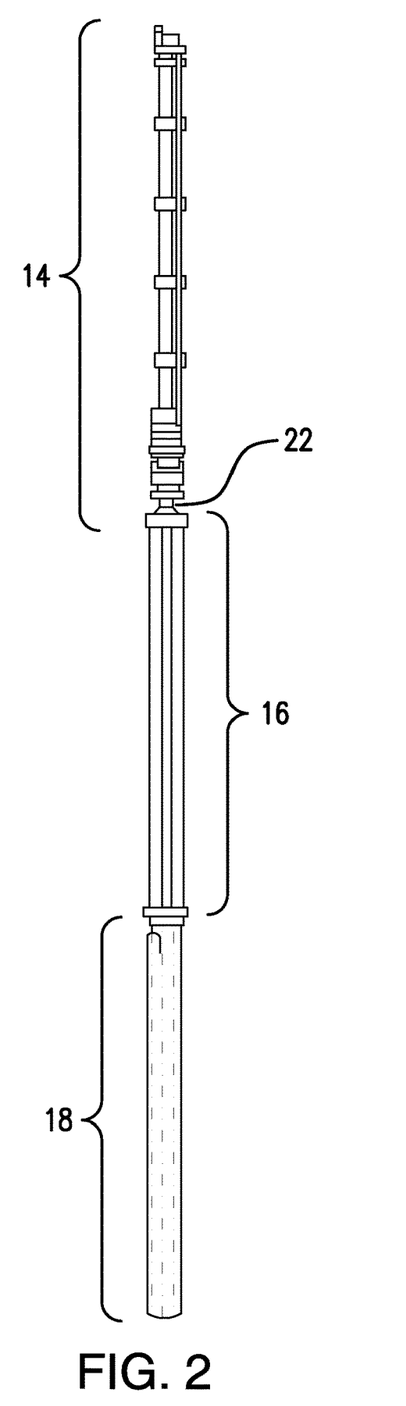
FIG. 2 is a side view of the control rod assembly shown in FIG. 1.

FIG. 1 shows only a lower portion of the illustrative pressure vessel 10. In an operating nuclear reactor, an open upper end 24 of the illustration is connected with one or more upper pressure vessel portions (not shown) that together with the illustrated lower portion of the pressure vessel 10 forms an enclosed pressure volume containing the reactor core 12, the control rods 18, the guide frame 16, and the internal CRDM 14. In an alternative embodiment, the CRDM 14 is external, located above the reactor pressure vessel. In such embodiments, the external CRDM is connected with the control rods 18 by a control rod/CRDM coupling assembly in which the connecting rod 30 extends through a portal in the upper portion of the pressure vessel. With reference to FIG. 2, the control assembly including the CRDM 14, the control rod guide frame 16, the intervening standoff 22, and the control rods 18 is illustrated isolated from the reactor pressure vessel. With reference to FIG. 3, the control rods 18 and the connecting rod 30 of the control rod assembly 40 are shown without any of the occluding components (e.g., without the guide frame, standoff, or CRDM). The spider 32 provides connection of the plurality of control rods 18 with the lower end of the corresponding connecting rod 30.

Referring now to FIGS. 4A, 4B, 5A, and 5B, a control rod assembly 40 including a disconnect mechanism 50 in accordance with the present disclosure is shown. The disconnect mechanism 50 includes a coupling sleeve 52 that is non-rotatably fixed to the bottom end of the connecting rod 30 (FIG. 3). Additionally, the disconnect mechanism 50 includes a spider 32, a spider receiver 34, a locking sleeve 36, an alignment cone assembly 43, and a barrel cam 60, all of which are releasably connectable to the connecting rod 30 by way of the coupling sleeve 52. As shown, the coupling sleeve 52 is non-rotatably and axially fixed to the bottom end of the connecting rod 30. The locking sleeve 36 and alignment cone 43 are similarly non-rotatably fixed to the spider receiver 34, however, the locking sleeve 36 is axially-slidable along a top portion of the spider receiver 34. Although the barrel cam 60 is axially fixed to the top portion of the spider receiver 34, it is rotatable thereabout, as discussed in greater below.

Figure 5A:
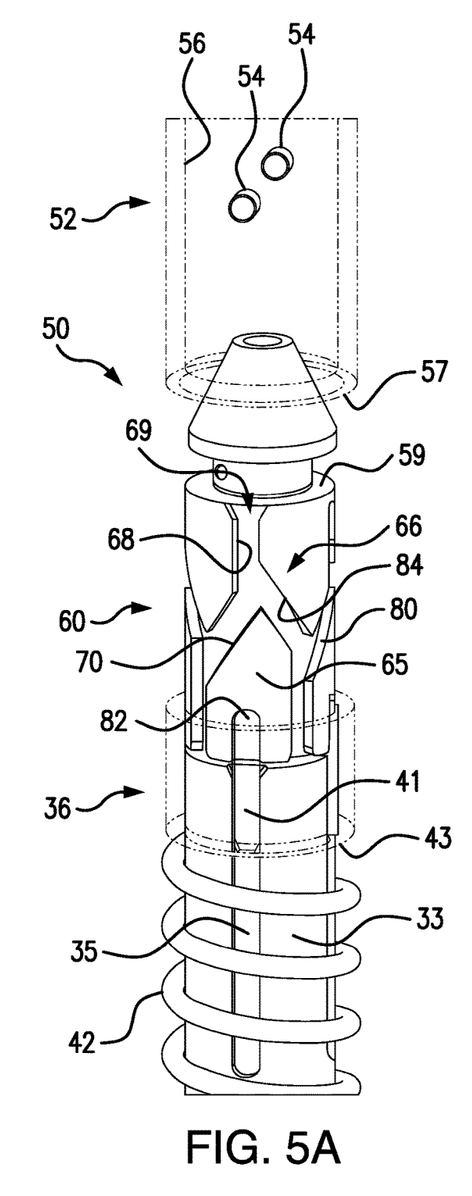
FIGS. 5A and 5B are perspective views, in the disengaged state and the engaged state, of the disconnect mechanism of the control rod assembly shown in FIGS. 4A and 4B.
Figure 5B:
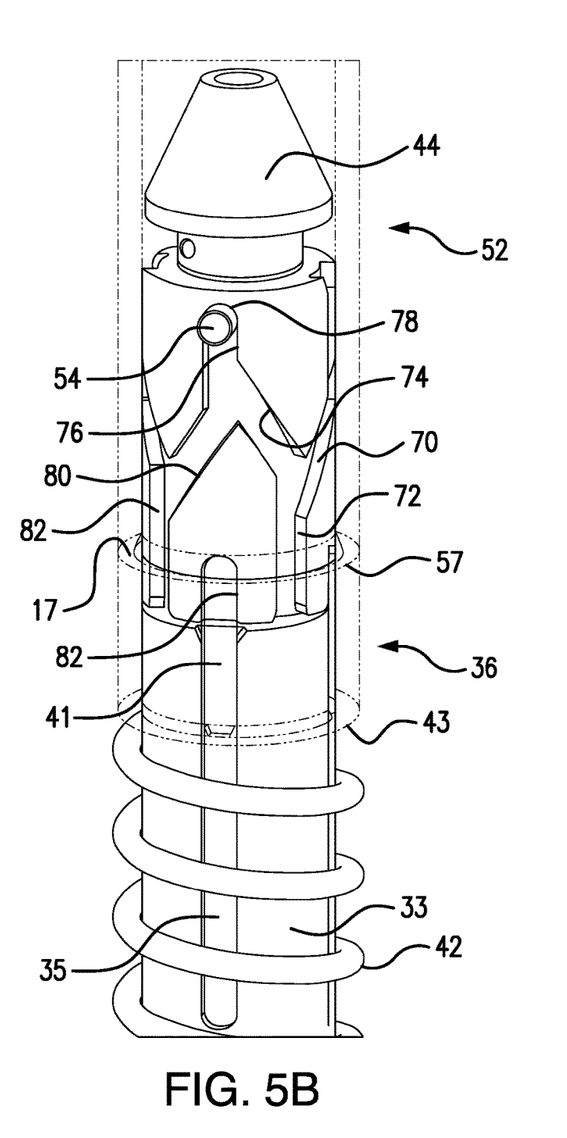

In the preferred embodiment shown, the spider 32 includes a cylindrical body portion 31, which is configured to receive a scram spring 21 and plunger 23 therein. The operation of these components are not relevant to the present disclosure and are, therefore, not discussed further herein. A top end of the cylindrical body portion 31 of the spider 32 is received in a cylindrical recess 37 that is defined in the bottom of the cylindrical body portion 33 of the spider receiver 34. As shown, a pair of opposed lock slots 35 are formed in an outer surface of the cylindrical body portion 33 of the spider receiver 34 and extend downwardly from a top end thereof. As best seen in FIGS. 5A and 5B, each lock slot 35 of the spider receiver 34 is configured to slidably receive a corresponding lock key 41 that depends radially inwardly from the inner surface of a cylindrical bore 38 defined by the locking sleeve 36. As such, the locking sleeve 36 is able to move axially with respect the spider receiver 34, yet is non-rotatably secured thereto. A lock spring 42 is disposed between a bottom edge 43 of the locking sleeve 36 and a bearing surface 19 of the spider receiver 34 so that the lock spring 42 biases the locking sleeve 36 upwardly with respect to the spider receiver 34. As well, a cylindrical axle portion 17 extends upwardly from the cylindrical body portion 33 of the spider receiver 34. The axle portion 17 is configured to receive the barrel cam 60 rotatably thereon, as discussed in greater detail below.

Figure 4A:
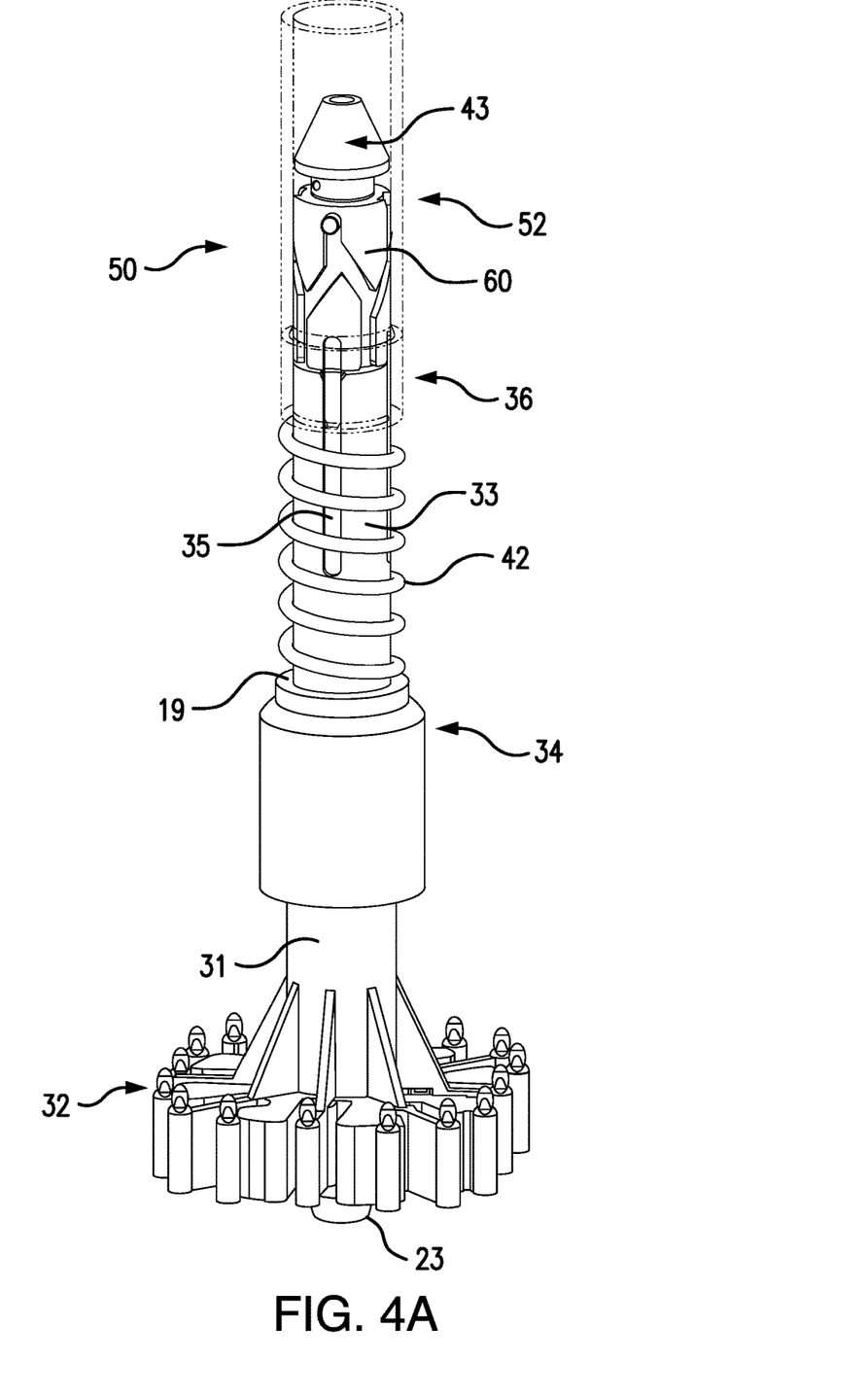
FIGS. 4A and 4B are a perspective view and a cross-sectional view, respectively, of the bottom end of a control rod assembly including a disconnect mechanism in accordance with an embodiment of the present disclosure.
Figure 4B:
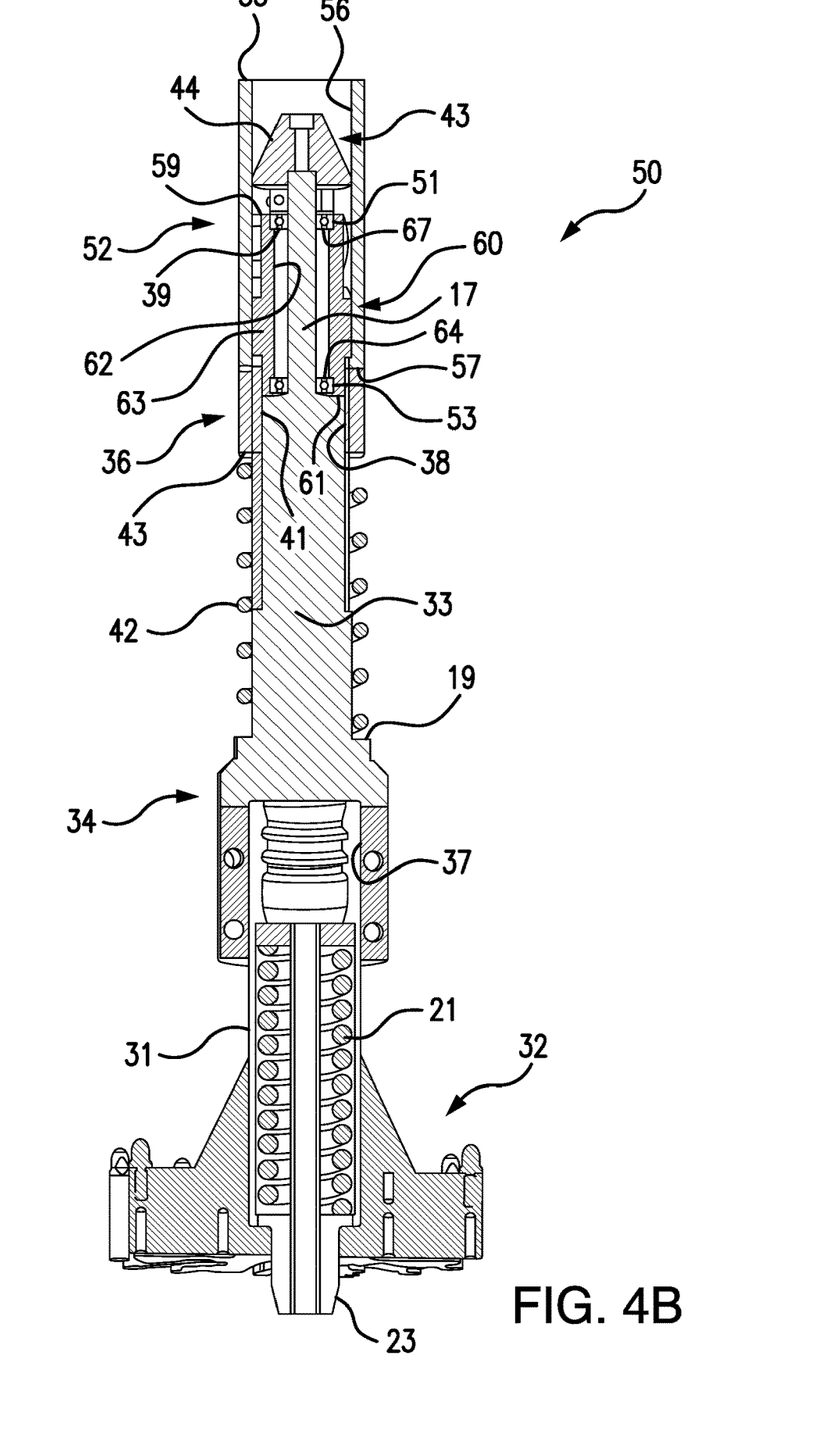

As shown, the barrel cam 60 includes a cylindrical body portion 63 that defines a cylindrical bore 62. A first bearing flange 64 is defined at the bottom end of the cylindrical bore 62 of the barrel cam 60 and a second bearing flange 67 is defined at a top end of the cylindrical bore 62. The first bearing flange 64 is configured to receive a first ring bearing 53 between itself and a top end of the cylindrical body portion 33 of the spider receiver 34, and the second bearing flange 67 is configured to receive a second ring bearing 51 between itself and a corresponding bearing flange 39 disposed on a bottom end of alignment cone 43. The first and second bearing rings 53 and 51 rotatably support the barrel cam 60 on the axle portion 17 of the spider receiver 34, as best seen in FIG. 4B. As shown, the alignment cone 43 defines mounting bore that is configured to receive a top portion of the axle portion 17 of the spider receiver 34. The alignment cone assembly 43 is axially fixed to the spider receiver 34, thereby axially securing the barrel cam 60 to the axle portion 17. Preferably, the alignment cone assembly 43 includes a frustoconically-shaped 44 top surface that is configured to align the coupling sleeve 52 properly with the barrel cam 60 as the barrel cam 60 is slidably received in the cylindrical bore 56 of the coupling sleeve 52. Note, the alignment cone assembly 43 may or may not be rotatable with respect to the axle portion of the spider receiver.

As best seen in FIGS. 5A and 5B, the outer cylindrical surface 65 of the barrel cam 60 defines a cam track 66 that is configured to slidably receive a pair of cam pins 54 that depend radially-inwardly from the inner surface of the cylindrical bore 56 of the coupling sleeve 52. Preferably, the cam track 66 includes a pair of entry slots 68 that each include an entry opening 69 that is in communication with a top end face 59 of the barrel cam 60. As shown, a bottom end face 61 of the barrel cam 60 is maintained adjacent the top end face of the cylindrical body portion 33 of the spider receiver 34. A pair of alignment slots 82 is formed adjacent the bottom end face 61 of the barrel cam 60. The alignment slots 82 are configured to axially align with the lock slots 35 formed in the outer surface of the cylindrical body portion 33 of the spider receiver 34 when the connecting rod 30 of the control rod assembly 40 is both connected to, and disconnected from, the spider receiver 34, as discussed in greater detail below.

Figure 6A:
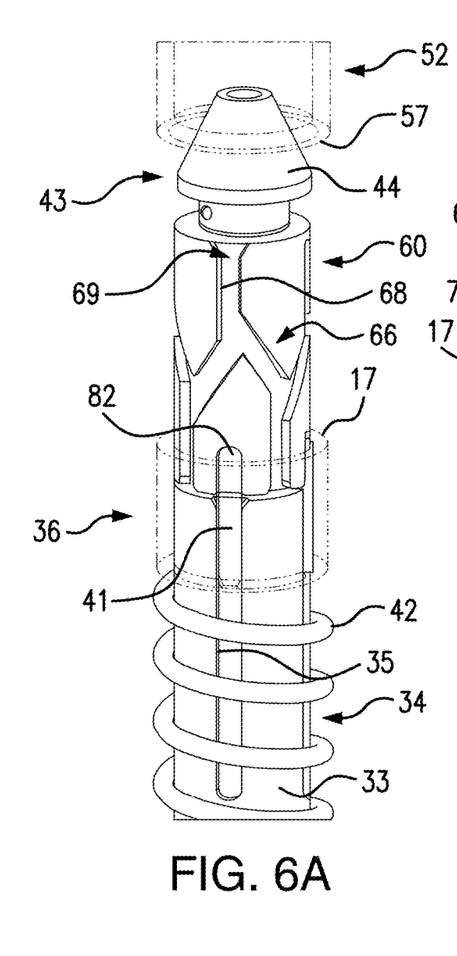
FIGS. 6A through 6I are perspective side views of the disconnect mechanism of the control rod assembly shown in FIGS. 4A and 4B undergoing a process of disconnecting the connecting rod from the control rods.
Figure 6B:
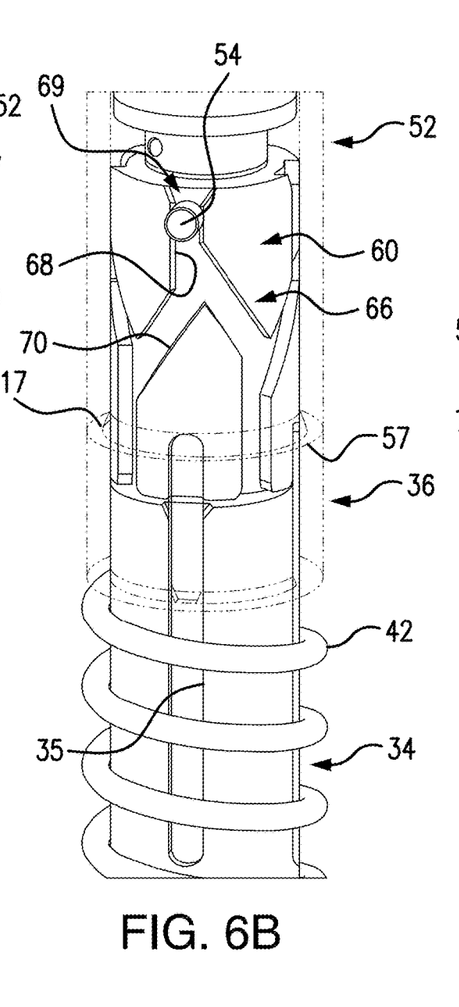

Referring now to FIGS. 6A through 6I, the operation of connecting the connecting rod 30 to the spider receiver 34 and corresponding control rods 18 is discussed. As shown in FIG. 6A, the operation begins with the connecting rod 30 (FIG. 3) and, therefore, the coupling sleeve 52 of the disconnect mechanism 50 being disconnected from the barrel cam 60 on the spider receiver 34. To connect the connecting rod 30 to the barrel cam 60 and spider receiver 34, the control rod drive mechanism 14 (FIG. 2) is activated so that the connecting rod 30 is driven downwardly with respect to the spider receiver 34. Referring additionally to FIG. 6B, as the connecting rod 30 is moved downwardly, the coupling sleeve 52, which is both non-rotatably and axially fixed to the bottom end of the connecting rod 30 is moved downwardly with respect to the spider receiver 34 until the bottom edge 57 of the coupling sleeve 52 begins to pass over the alignment cone assembly 43. If the coupling sleeve 52 is not properly aligned in the barrel cam 60, the frustoconical top surface 44 of the alignment core assembly 43 helps to insure the barrel cam 60 becomes centered by interacting with the bottom edge 57 of the coupling sleeve 52. Once properly centered, the connecting rod 30 continues downward until the bottom edge 57 of the coupling sleeve 52 makes contact with a top edge 17 of the locking sleeve 36.

As shown in FIG. 6B, for the coupling sleeve 52 to make contact with the locking sleeve 36, the cam pin 54 that depends radially-inwardly from the inside surface of the coupling sleeve 52 must be slidably received in the openings 69 of the entry slots 68 of the cam track 66. To do so, the barrel cam 60 must be properly aligned with the cam pins 54 of the coupling sleeve 52. Although the barrel cam 60 is rotatable with respect to the spider receiver 34, the locking sleeve 36 is not. As previously noted, a pair of lock keys 41 on the locking sleeve 36 engage corresponding lock slots 35 on the spider receiver 34. As shown in FIG. 6A, the lock keys 41 of the locking sleeve 36 extend the axial length of the locking sleeve 36 and are also configured to engage a corresponding set of alignment slots 82 formed in an outer surface of the barrel cam 60, adjacent its bottom edge. When the connecting rod 30 is disengaged from the spider receiver 34, and the locking sleeve 36 is urged into its uppermost position by lock spring 42, the lock keys 41 of the locking sleeve 36 engage both the alignment slots 82 of the barrel cam 60 and the lock slots 35 of the spider receiver 34. As such, the barrel cam 60 is non-rotatably fixed to the spider receiver 34 in a position that allows the cam pins 54 of the coupling sleeve 52 to be axially aligned with the openings 69 of the entry slots 68 of the cam track 66.

Figure 6C:
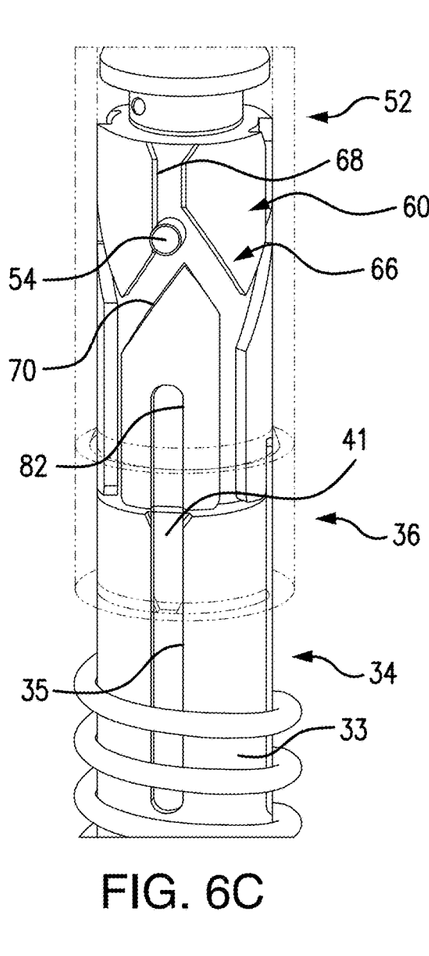
Figure 6D:
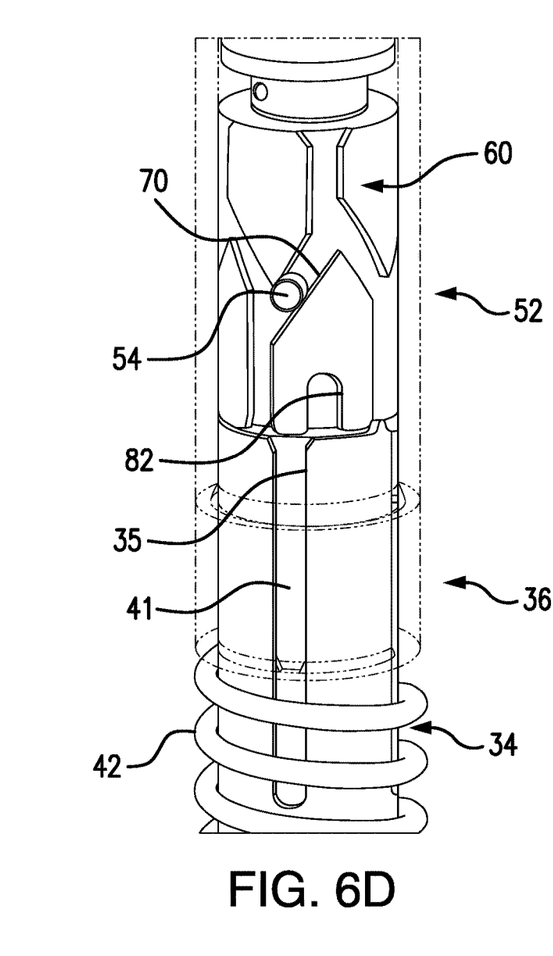
Figure 6E:
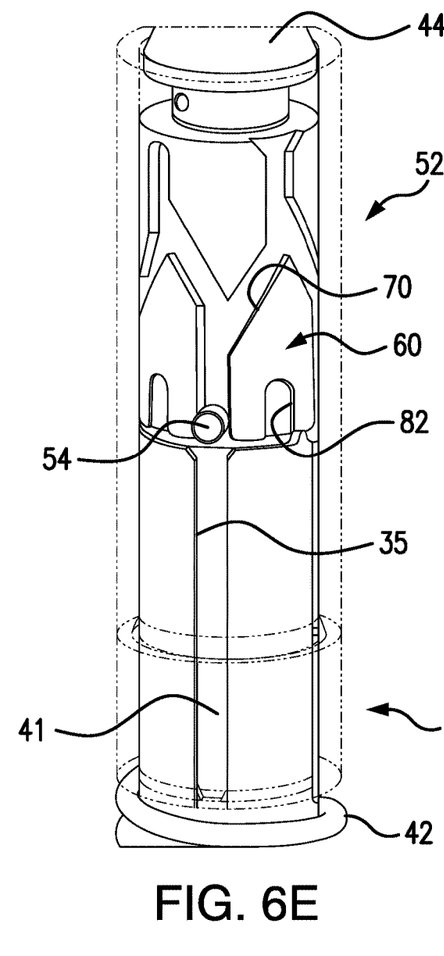

Referring additionally to FIG. 6C, continued downward movement of the coupling sleeve 52 with regard to the barrel cam 60 causes the coupling sleeve 52 to urge the locking sleeve 36 downwardly with regard to the cylindrical body portion 33 of the spider receiver 34 until the lock keys 41 of the locking sleeve 36 exit the alignment slots 82 of the barrel cam 60. At this point, the barrel cam 60 is no longer non-rotatably secured to the spider receiver 34 by the locking sleeve 36. As such, interaction of the cam pins 54 with the first camming surface 70, as shown in FIG. 6D, causes the barrel cam 60 to rotate in a counter-clockwise direction with respect to the spider receiver 34, when viewed from above. As shown in FIG. 6E, the cam track 66 defines a vertical bottom slot (including surface 72) that will axially align with the lock slots 35 of the spider receiver 34. As a result, cam pins 54 of the coupling sleeve 52, which is non-rotatably secured to the connecting rod 30, will also axially align with the lock slots 35 of the spider receiver 34 to protect against damage due to excessive downward motion of the connecting rod when attempting a connecting operation. Rather than being possibly damaged due to impact with the cylindrical body portion 33 of the spider receiver 34, the cam pins 54 are slidably received within the lock slots 35 of the spider receiver 34 until the connecting rod 30 is eventually moved back in an upward direction. Note, the lock spring 42 maintains constant upward biasing force on the locking sleeve 36 so that the locking sleeve 36 remains adjacent the coupling sleeve 52 during both downward and upward movement of the connecting rod 30.

Figure 6F:
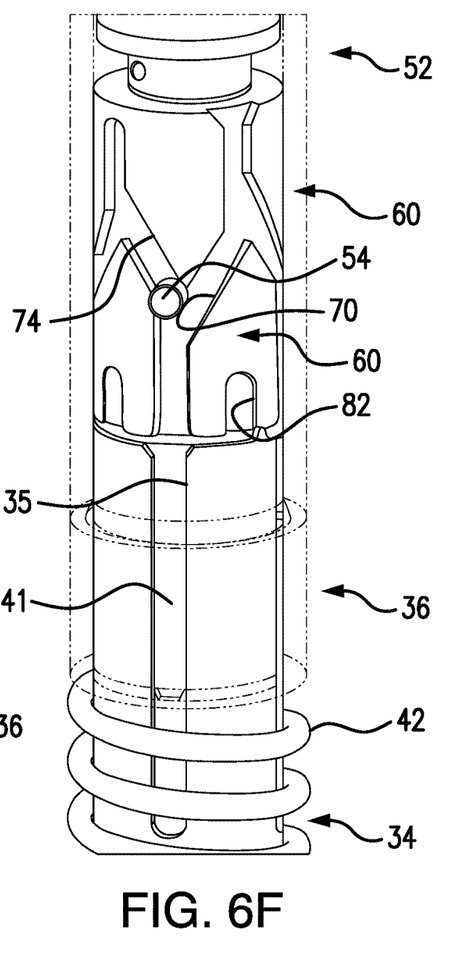
Figure 6G:
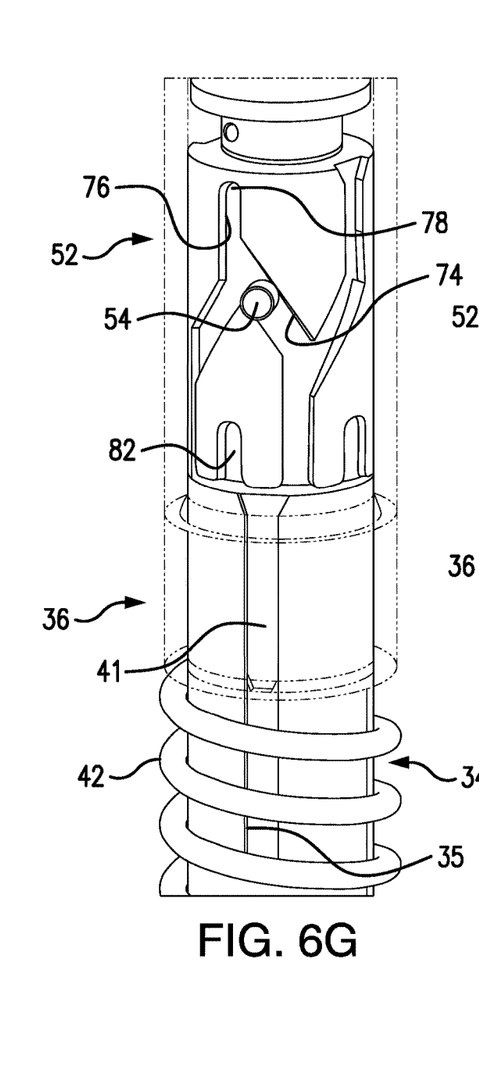
Figure 6H:
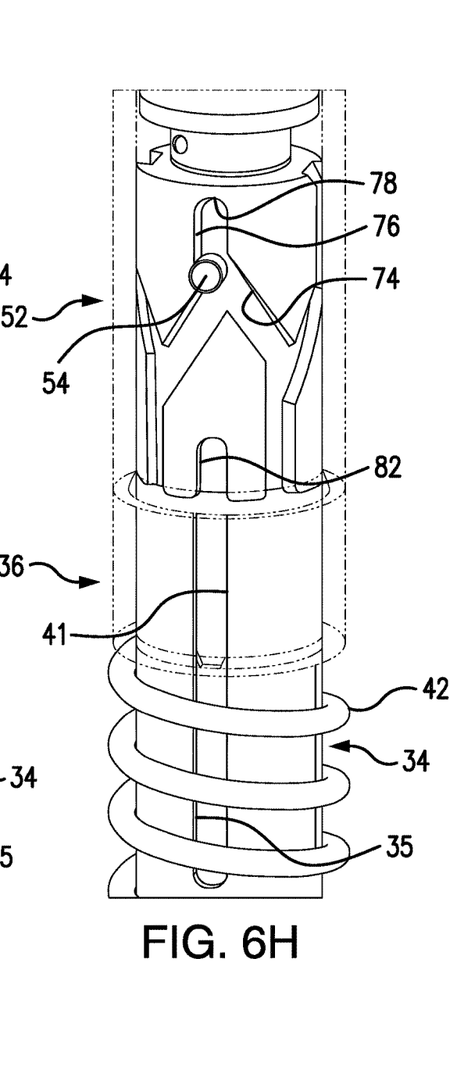
Figure 6I:
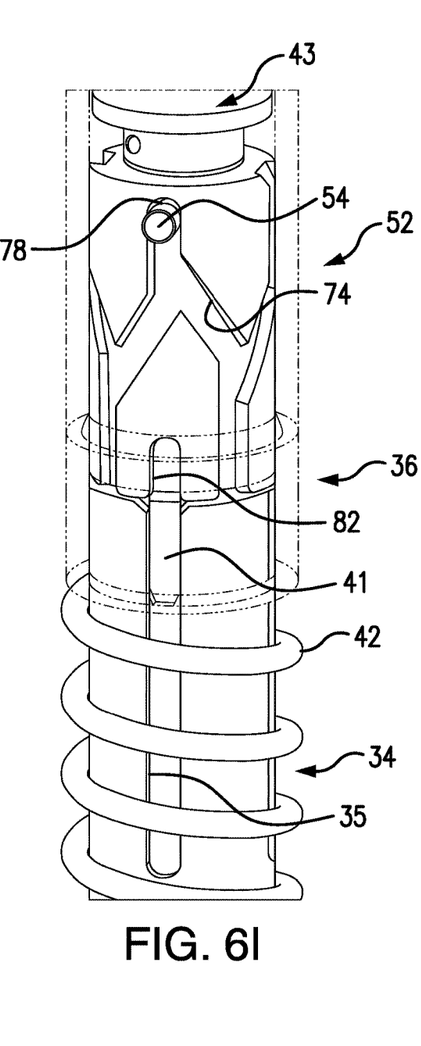

Referring now to FIGS. 6F and 6G, in order to engage the connecting rod 30 with the spider receiver 34, the connecting rod 30 is next moved in an upwardly direction until the cam pins 54 of the coupling sleeve 52 engage corresponding second camming surfaces 74 of the cam track 66. Continued upward movement of the cam pins 54 causes further rotation of the barrel cam 60 in the counter-clockwise direction until each cam pin 54 engages the corresponding hold slot 76. Each hold slot 76 includes a top abutment surface 78 that allows the spider receiver 34 and corresponding control rods 18 to be suspended from the pair of cam pins 54, as shown in FIGS. 3 and 6I. Note also, as the connecting rod 30 moves upwardly with regard to the barrel cam 60 so that the cam pins 54 slide along the second camming surfaces 74, the barrel cam 60 rotates until the alignment slots 82 are once again aligned with the lock slots 35 of the spider receiver 34. As such, the lock keys 41 of the locking sleeve 36 may engage both the alignment slots 82 of the barrel cam 60 and the lock slots 35 of the spider receiver simultaneously as the cam pins 54 move upwardly in the hold slots 76. As such, when the connecting rod 30 is fully engaged with the spider receiver 34, the barrel cam 60 is non-rotatably secured to the spider receiver by the lock keys 41 of the locking sleeve 36. An operator is now free to both raise and lower the control rods by way of the control rod drive mechanism as desired.

Figure 7A:
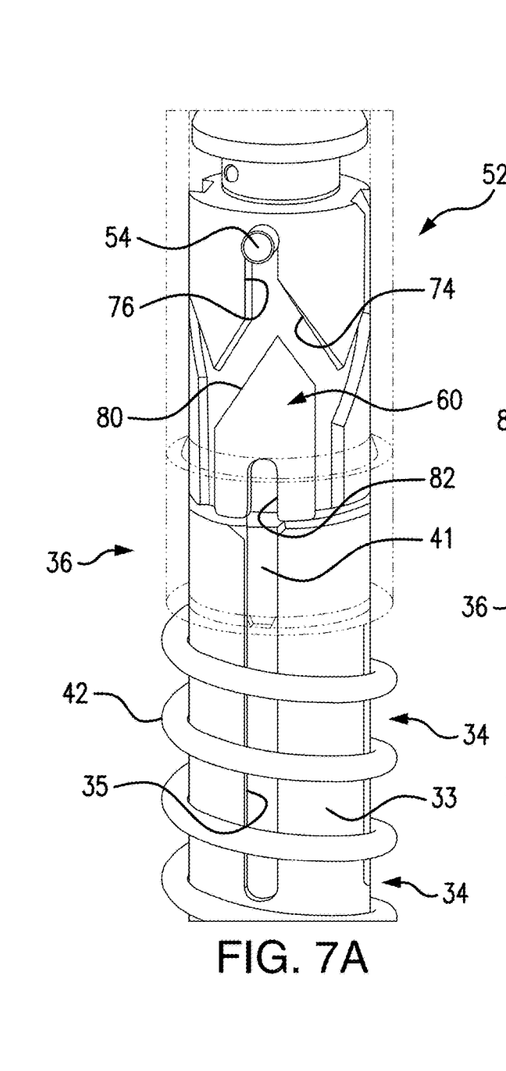
FIGS. 7A and 7I are perspective side views of the disconnect mechanism of the control rod assembly shown in FIGS. 4A and 4B undergoing a process of connecting the connecting rod to the control rods.
Figure 7B:
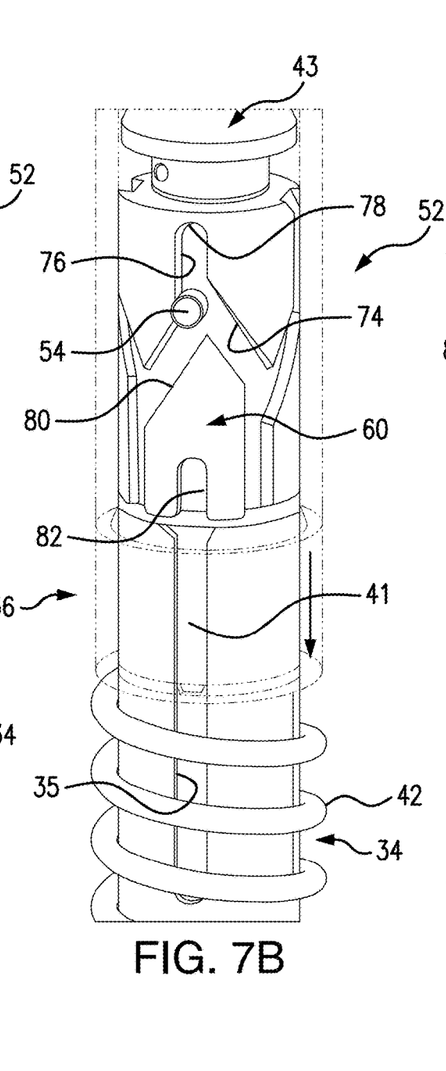

Referring now to FIGS. 7A through 7I, the operation of disconnecting the connecting rod from the spider receiver 34 and corresponding control rods 18 is discussed. As shown in FIG. 7A, the operation begins with the connecting rod 30 (FIG. 3) and, therefore, the coupling sleeve 52 of the disconnect mechanism 50 being connected to the barrel cam 60 on the spider receiver 34 with the cam pins 54 being fully seated against the top abutment surfaces 78 of the corresponding hold slots 76. To disconnect the connecting rod 30 from the barrel cam 60 and spider receiver 34, the control rod drive mechanism 14 (FIG. 2) is activated so that the connecting rod 30 is driven downwardly with respect to the spider receiver 34. Referring additionally to FIG. 7B, as the connecting rod 30 is moved downwardly, the coupling sleeve 52, which is both non-rotatably and axially fixed to the bottom end of the connecting rod 30 is moved downwardly with respect to the barrel cam 60 against the upward biasing force exerted by lock spring 42 on locking sleeve 36.

Figure 7C:
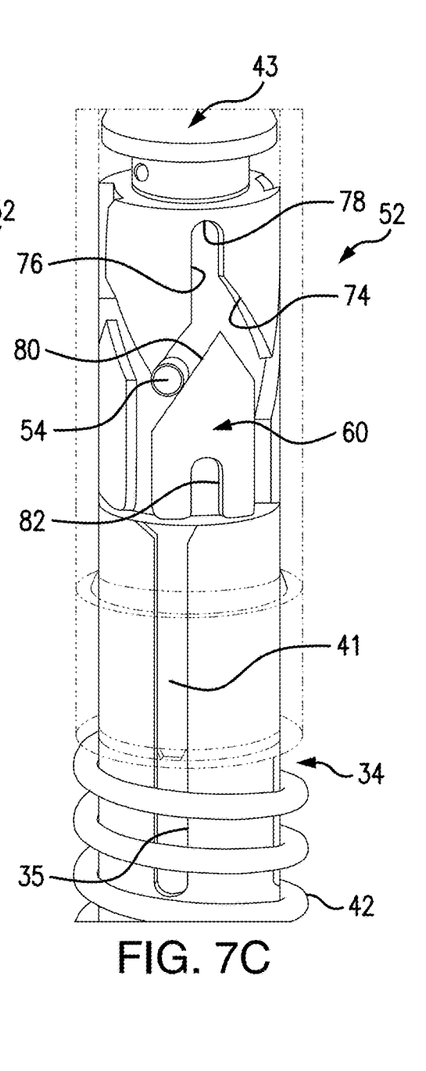

As the control rod 30 moves downwardly, the lock keys 41 of the locking sleeve 36 moves downwardly within both the alignment slots 82 of the barrel cam 60 and the lock slots 35 of the spider receiver 34, as best seen in FIGS. 7B and 7C. Once the lock keys 41 of the locking sleeve 36 are fully withdrawn from the alignment slots 82 of the barrel cam 60, the barrel cam 60 is free to rotate.

Figure 7D:
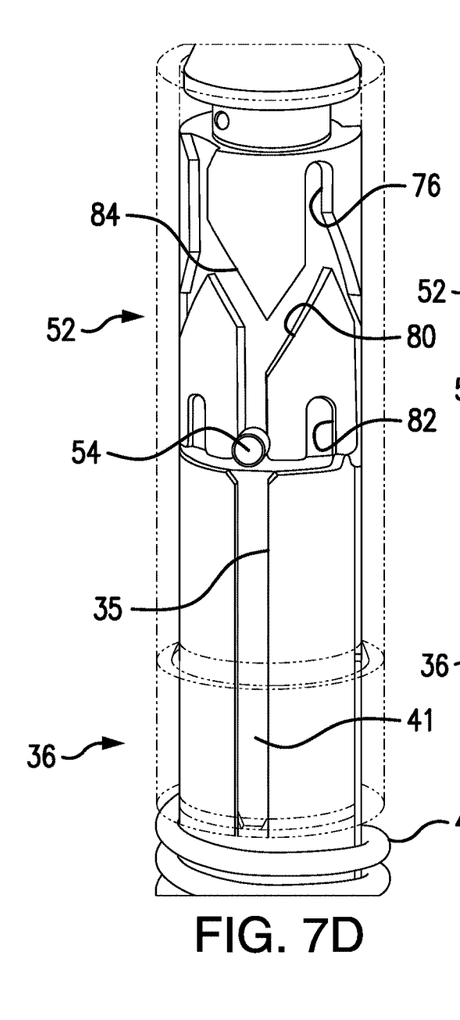
Figure 7E:
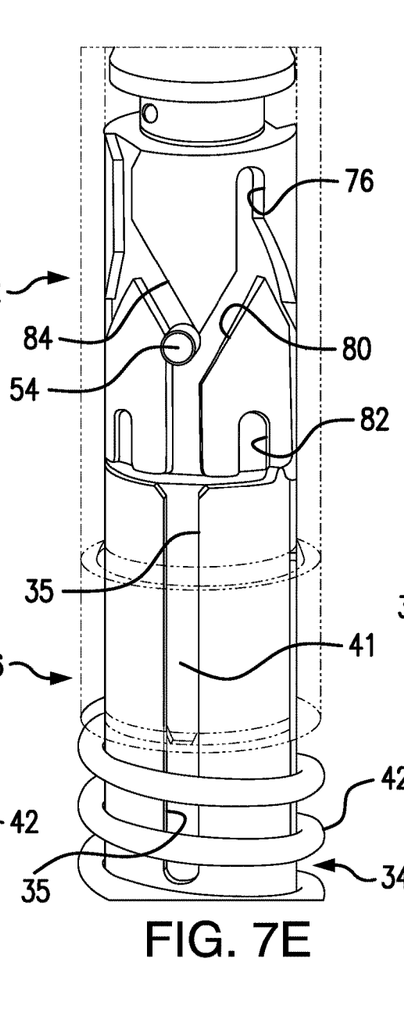

As noted, continued downward movement of the coupling sleeve 52 with regard to the barrel cam 60 causes the coupling sleeve 52 to urge the locking sleeve 36 downwardly with regard to the cylindrical body portion 33 of the spider receiver 34 until the lock keys 41 of the locking sleeve 36 exit the alignment slots 82 of the barrel cam 60. At this point, the barrel cam 60 is no longer non-rotatably secured to the spider receiver 34 by the locking sleeve 36. As such, interaction of the cam pins 54 with a first camming surface 80, as shown in FIG. 7C, causes the barrel cam 60 to rotate in a counter-clockwise direction with respect to the spider receiver 34, when viewed from above. As best seen in FIGS. 7D and 7E, the cam pins 54 of the coupling sleeve 52, which is non-rotatably secured to the connecting rod 30, are axially aligned with the lock slots 35 of the spider receiver 34 to protect against damage due to excessive downward motion of the connecting rod when attempting a disconnecting operation. As previously noted, rather than being possibly damaged due to impact with the cylindrical body portion 33 of the spider receiver 34, the cam pins 54 are able to be slidably received within the lock slots 35 of the spider receiver 34 until the connecting rod 30 is eventually moved back in an upward direction.

Figure 7F:
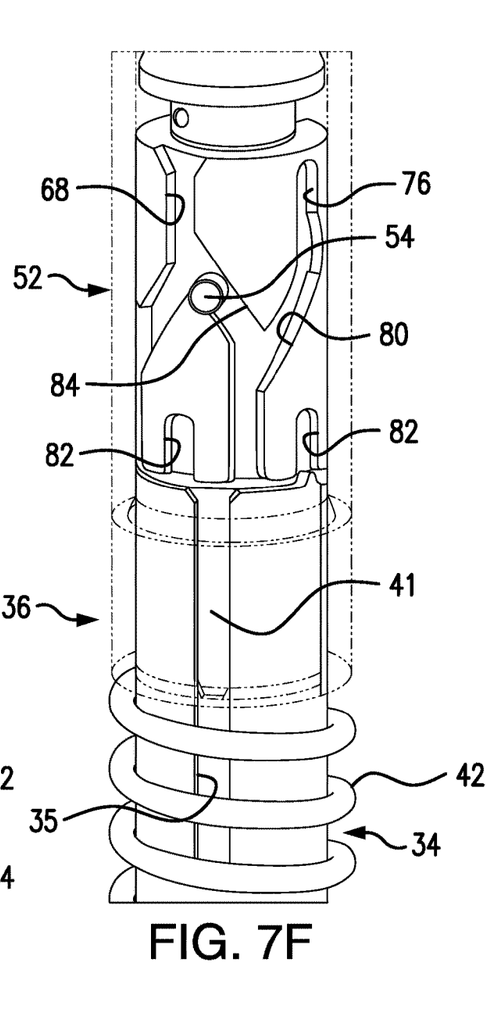
Figures 7G, 7H:
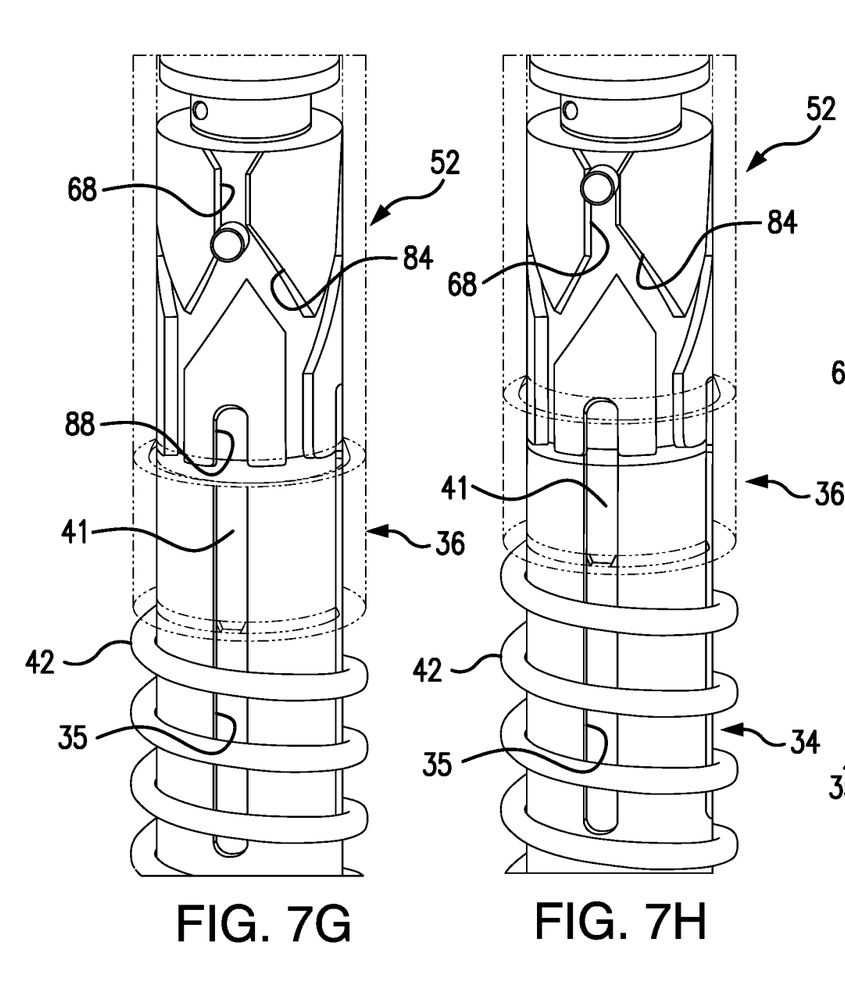
Figure 7I:
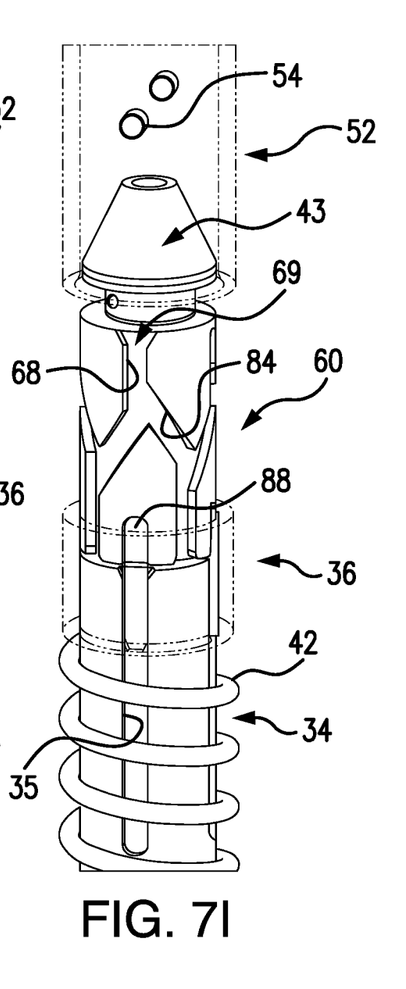

Referring now to FIGS. 7F and 7G, in order to disengage the connecting rod 30 from the spider receiver 34, the connecting rod 30 is next moved in an upwardly direction until the cam pins 54 of the coupling sleeve 52 engage corresponding fourth camming surfaces 84 of the cam track 66. Continued upward movement of the cam pins 54 causes further rotation of the barrel cam 60 in the counter-clockwise direction until each cam pin 54 re-engages the corresponding entry slot 68. As previously discussed, each exit slot 68 includes an open entry 69 that allows the cam pins 54 to be vertically removed from the cam track 66, as shown in FIGS. 7H and 7I. Note also, as the connecting rod 30 moves upwardly with regard to the barrel cam 60 so that the cam pins 54 slide along the fourth camming surfaces 84, the barrel cam 60 rotates until the alignment slots 82 are once again aligned with the lock slots 35 of the spider receiver 34. As such, the lock keys 41 of the locking sleeve 36 may engage both the alignment slots 82 of the barrel cam 60 and the lock slots 35 of the spider receiver simultaneously as the cam pins 54 move upwardly in the entry slots 68. As such, when the connecting rod 30 is fully disconnected from the spider receiver 34, the barrel cam 60 is non-rotatably secured to the spider receiver by the lock keys 41 of the locking sleeve 36 so that the barrel cam 60 is properly aligned for re-engagement with the coupling sleeve 52 in the future.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

The invention claimed is:

1. A control rod assembly for use with a reactor core, comprising:

an elongated connecting rod;
a spider assembly that is releasably securable to the connecting rod;
a plurality of control rods that extends downwardly from the spider assembly;
a coupling sleeve secured to a bottom end of the connecting rod, the coupling sleeve including a body portion with an inner wall defining a cylindrical central bore and at least one cam pin extending radially-inward from the inner wall of the central bore; and
a barrel cam being mounted to an upper portion of the spider assembly such that it is rotatable with respect to the spider assembly but axially fixed thereto, the barrel cam having a cylindrical body portion with an outer surface thereof defining a cam track, the cam track including at least one entry opening defined by a top end face of the body portion of the barrel cam, at least one first camming surface, and at least one second camming surface, the at least one first camming surface and the at least one second camming surface being configured so that the barrel cam rotates in a first direction as the at least one cam pin slides along the at least one first camming surface and the at least one second camming surface;
wherein the barrel cam is rotatable with respect to the connecting rod between a first position in which the spider is connected to the connecting rod, and a second position in which the spider is disconnected from the connecting rod.

2. The control rod assembly of claim 1, wherein when the at least one cam pin further comprises a pair of cam pins, the at least one first camming surface further comprises a pair of first camming surfaces, and the at least one second camming surface further comprises a pair of second camming surfaces.

3. A control rod assembly for use with a reactor core, comprising:
an elongated connecting rod;
a spider assembly that is releasably securable to the connecting rod;
a plurality of control rods that extends downwardly from the spider assembly;
a coupling sleeve secured to a bottom end of the connecting rod, the coupling sleeve including a body portion with an inner wall defining a cylindrical central bore and at least one cam pin extending radially-inward from the inner wall of the central bore;
a barrel cam being rotatably secured to an upper portion of the spider assembly having a cylindrical body portion with an outer surface thereof defining a cam track, the cam track including at least one entry opening defined by a top end face of the body portion of the barrel cam, at least one first camming surface, and at least one second camming surface, the at least one first camming surface and the at least one second camming surface being configured so that the barrel cam rotates in a first direction as the at least one cam pin slides along the at least one first camming surface and the at least one second camming surface; and
an alignment cone assembly secured to the upper portion of the spider assembly adjacent a top end of the barrel cam, the alignment cone assembly including a frusto-conical top surface and being slidably receivable within the central bore of the coupling sleeve;
wherein the barrel cam is rotatable with respect to the connecting rod between a first position in which the spider is connected to the connecting rod, and a second position in which the spider is disconnected from the connecting rod.

4. A control rod assembly for use with a reactor core, comprising:
an elongated connecting rod;
a spider assembly that is releasably securable to the connecting rod;
a plurality of control rods that extends downwardly from the spider assembly;
a coupling sleeve secured to a bottom end of the connecting rod, the coupling sleeve including a body portion with an inner wall defining a cylindrical central bore and at least one cam pin extending radially-inward from the inner wall of the central bore;
a barrel cam being rotatably secured to an upper portion of the spider assembly having a cylindrical body portion with an outer surface thereof defining a cam track, the cam track including at least one entry opening defined by a top end face of the body portion of the barrel cam, at least one first camming surface, and at least one second camming surface, the at least one first camming surface and the at least one second camming surface being configured so that the barrel cam rotates in a first direction as the at least one cam pin slides along the at least one first camming surface and the at least one second camming surface; and
a locking sleeve defining a central bore and a lock key extending radially-inwardly therefrom, wherein the locking sleeve is disposed about an upper portion of the spider assembly so that the lock key is slidably received in a lock slot formed in an outer surface of the upper portion of the spider assembly so that the locking sleeve is non-rotatably fixed to the upper portion of the spider assembly,
wherein the barrel cam is rotatable with respect to the connecting rod between a first position in which the spider is connected to the connecting rod, and a second position in which the spider is disconnected from the connecting rod.

5. The control rod assembly of claim 4, further comprising a lock spring that is disposed between the locking sleeve and a portion of the spider assembly so that the lock spring exerts upward biasing force on the locking sleeve.

6. The control rod assembly of claim 4, wherein the barrel cam further defines an alignment slot in the outer surface of the body portion and the lock key of the locking sleeve is disposed within both the alignment slot and the lock slot of the spider assembly when the barrel cam is in both the first position and the second position.

7. The control rod assembly of claim 4, wherein the lock key of the locking sleeve is engaged with the barrel cam when the barrel cam is in both the first position and the second position, thereby preventing rotation of the barrel cam with respect to the spider assembly when the barrel cam is in both the first position and the second position.

8. The control rod assembly of claim 4, wherein the at least one cam pin of the coupling sleeve is slidably receivable in an alignment slot of the spider assembly, the cam track of the barrel cam includes two cam tracks, and the lock key of the locking sleeve includes two lock keys.

9. The control rod assembly of claim 1, wherein the cam track of the barrel cam further comprises at least one hold slot including a top support surface, wherein the hold slot is configured to slidably receive the at least one cam pin therein so that the spider assembly is supported by abutment of the at least one cam pin with the top support surface.

10. The control rod assembly of claim 1, further comprising an alignment cone assembly secured to the upper portion of the spider assembly adjacent a top end of the barrel cam, the alignment cone assembly including a frustoconical top surface and being slidably receivable within the central bore of the coupling sleeve.

11. The control rod assembly of claim 10, further comprising a locking sleeve defining a central bore and a lock key extending radially-inwardly therefrom, wherein the locking sleeve is disposed about an upper portion of the spider assembly so that the lock key is slidably received in a lock slot formed in an outer surface of the upper portion of the spider assembly so that the locking sleeve is non-rotatably fixed to the upper portion of the spider assembly.

12. The control rod assembly of claim 11, further comprising a lock spring that is disposed between the locking sleeve and a portion of the spider assembly so that the lock spring exerts upward biasing force on the locking sleeve.

13. The control rod assembly of claim 11, wherein the barrel cam further defines an alignment slot in the outer surface of the body portion and the lock key of the locking sleeve is engageable with the alignment slot.

14. The control rod assembly of claim 13, wherein the lock key of the locking sleeve is engaged with the alignment slot of the barrel cam when the barrel cam is in both the first position and the second position, thereby preventing rotation of the barrel cam with respect to the spider assembly.

15. A control rod disconnect assembly for use with an elongated connecting rod, comprising:
   a coupling sleeve attachable to the connecting rod, the coupling sleeve including a body portion defining a cylindrical central bore and at least one cam follower extending from an inner wall of the central bore;
   a spider assembly adapted to carry at least one control rod;
   a barrel cam that is axially fixed but rotatably secured to an upper portion of the spider assembly, the barrel cam having a cylindrical body portion with an outer surface thereof defining a cam track in which the cam follower is received, the cam track being configured such that vertical movement of the coupling sleeve rotates the barrel cam between a first position in which the spider is connected to the connecting rod and a second position in which the spider is disconnected from the connecting rod; and
   a locking sleeve disposed about an upper portion of the spider assembly and being axially movable by the coupling sleeve, the locking sleeve alternately engageable with the barrel cam to prevent rotation of the barrel cam but axially separable from the barrel cam to allow rotation of the barrel cam.

16. The control rod disconnect assembly of claim 15, further comprising a lock spring disposed between the locking sleeve and a portion of the spider assembly so that the lock spring exerts upward biasing force on the locking sleeve.

17. The control rod disconnect assembly of claim 16, wherein the cam track defines a vertical entry slot, a first slot camming surface extending obliquely in a downward direction from the vertical entry slot, and a second camming surface extending obliquely in an upward direction away from the first camming surface.

18. The control rod disconnect assembly of claim 17, wherein the cam track has a vertical bottom slot that aligns with a lock slot of the spider assembly as the barrel cam moves between the first position and the second position.

19. The control rod disconnect assembly of claim 16, wherein the barrel cam further defines an alignment slot and a lock key of the locking sleeve is disposed within both the alignment slot and a lock slot of the spider assembly when the barrel cam is in both the first position and the second position, thereby preventing rotation of the barrel cam with respect to the spider assembly.

20. The control rod disconnect assembly of claim 15, further comprising an alignment cone assembly secured to the upper portion of the spider assembly adjacent a top end of the barrel cam, the alignment cone assembly being slidably receivable within the central bore of the coupling sleeve.

\* \* \* \* \*